INVENTORS
A. F. RUS
C. C. VEALE
BY C. B. Hamilton
ATTORNEY

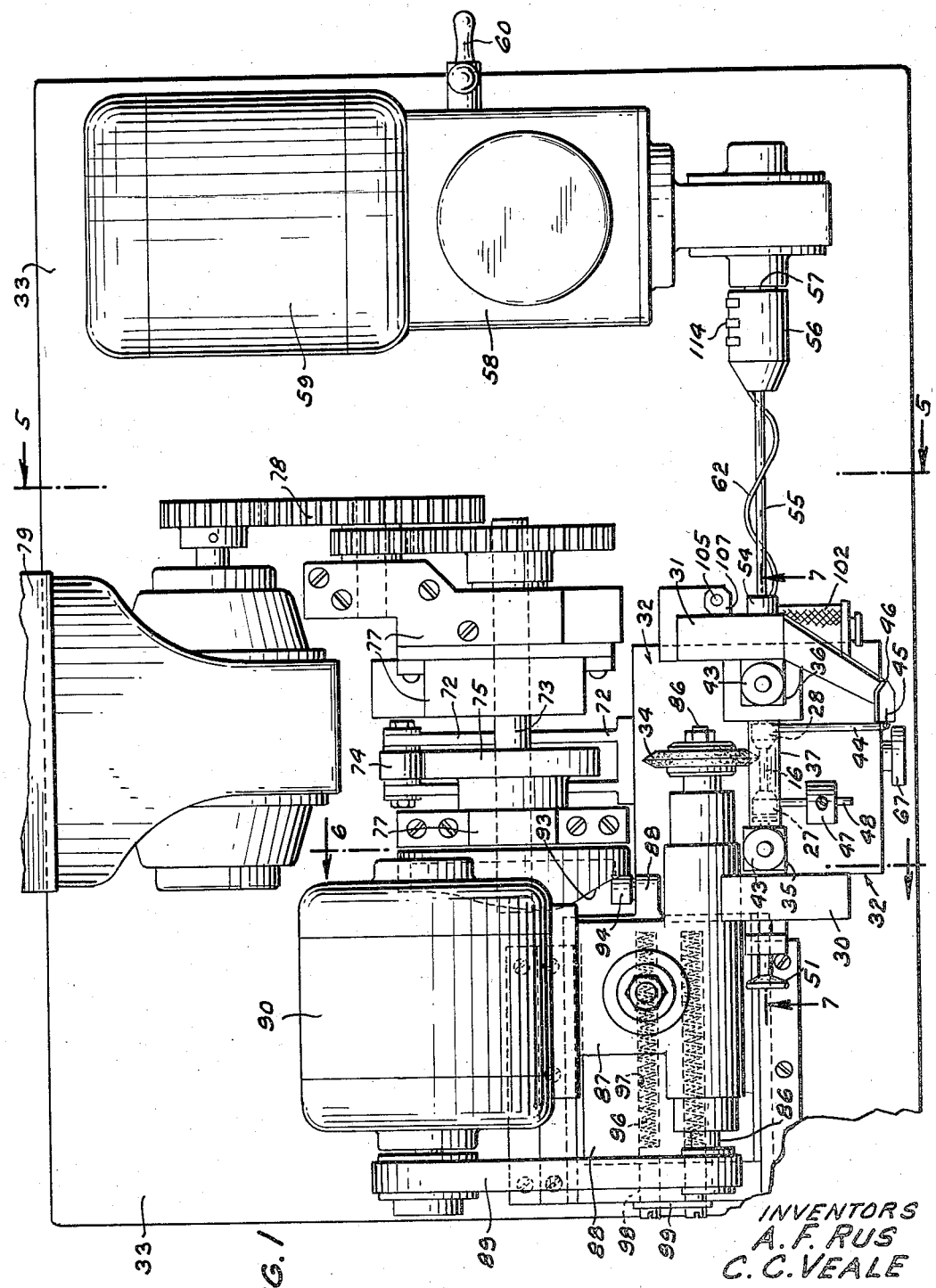

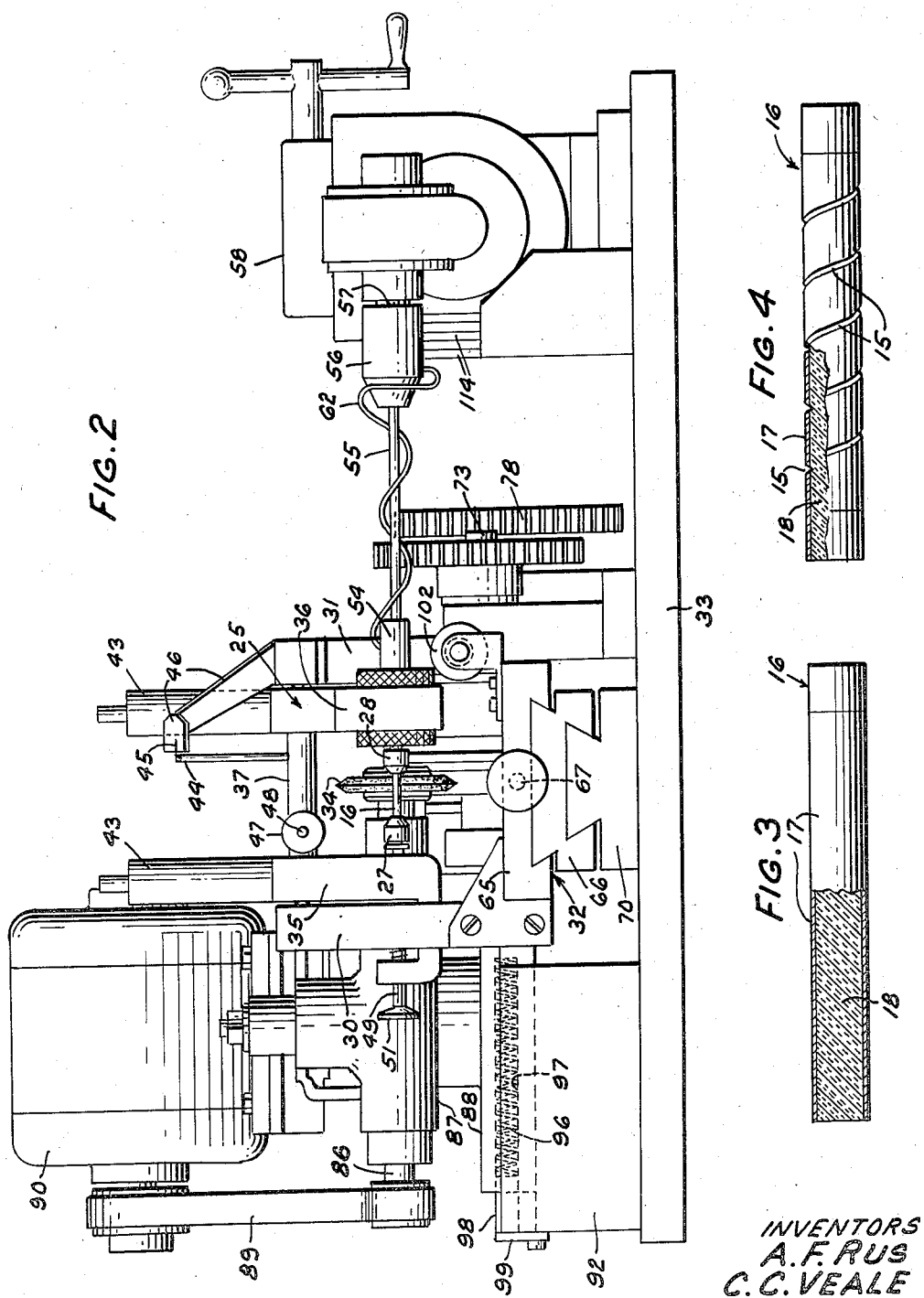

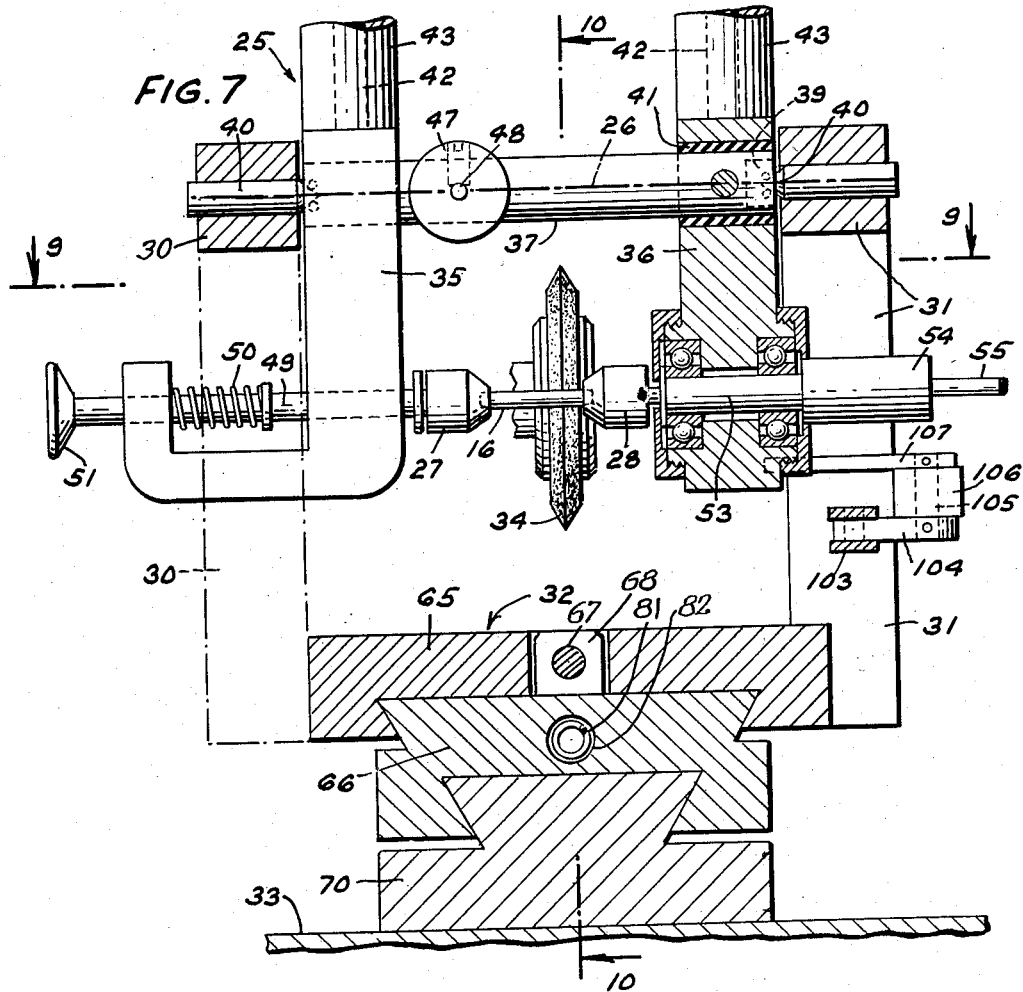
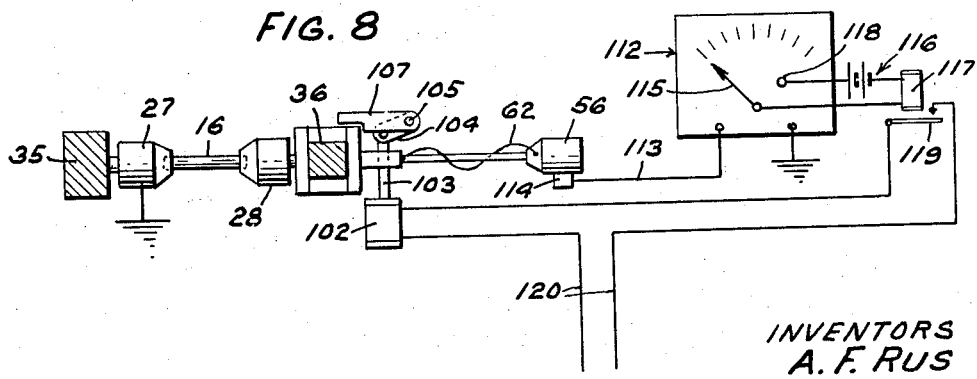

United States Patent Office 2,884,746
Patented May 5, 1959

2,884,746

ELECTRICAL RESISTANCE MEASURING APPARATUS FOR CUTTING HELICAL GROOVES IN RESISTORS

Albert F. Rus, Riverside, and Charles C. Veale, West Chicago, Ill., assignors to Western Electric Company, Incorporated, New York, N.Y., a corporation of New York Application March 30, 1955, Serial No. 497,889

6 Claims. (Cl. 51—37)

This invention relates to apparatus for cutting helical grooves in electrically conducting coatings of resistors, and more particularly to such apparatus having means for measuring the resistance of the resistors and for terminating the groove cutting operation when the resistance reaches a predetermined value.

An object of the invention is to provide an efficient and effective apparatus for cutting helical grooves of desired and varying lengths in electrically conducting coatings of resistors.

Another object of the invention is to provide an apparatus for cutting helical grooves in an electrical conducting coating of a resistor and for measuring the changing resistance thereof and terminating the cutting operation when the resistance reaches a predetermined value.

A further object of the invention is to provide an apparatus for cutting a helical groove in a resistor and for supporting the resistor for quick movement out of engagement with the cutter of the apparatus.

An apparatus illustrating certain features of the invention may include a holder pivotally mounted on a carriage for oscillation about a horizontal axis and having a pair of rotatable chucks for supporting the resistor for rotation below and parallel to said axis. The carriage is cam actuated to move the resistor in the holder into engagement with a rotating cutter which is mounted on a slide and cam actuated in a direction parallel to said axis for cutting a helical groove in the carbon resistance coating as the resistor is being rotated. The chucks and the resistor carried thereby are connected to a resistance measuring device which serves to effect the energization of a solenoid for swinging the holder and the resistor away from the cutter when the resistance of the resistor has reached a predetermined value.

Other objects and advantages of the invention will become apparent by reference to the following detailed description and the accompanying drawings illustrating a preferred embodiment thereof, in which Fig. 1 is a plan view of the apparatus for cutting a helical groove in the carbon coating of cylindrical resistor elements;

Fig. 2 is a front view of the apparatus;

Fig. 3 is an enlarged view of an uncut cylindrical carbon coated resistor element;

Fig. 4 is an enlarged view of the resistor element after a helical groove has been cut therein;

Figure 5:
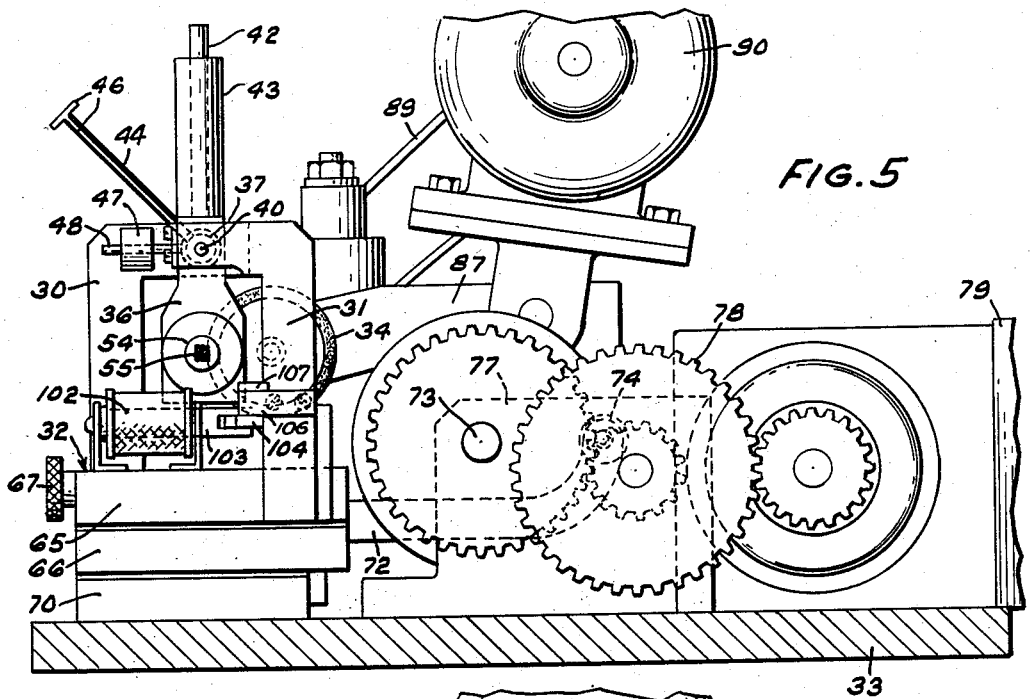
Figure 6:
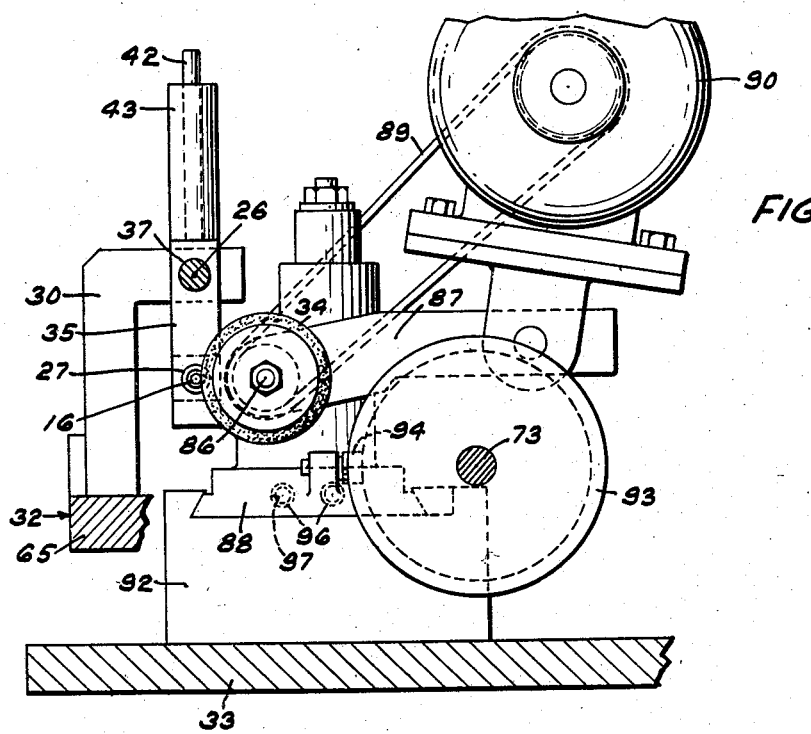
Figure 9:
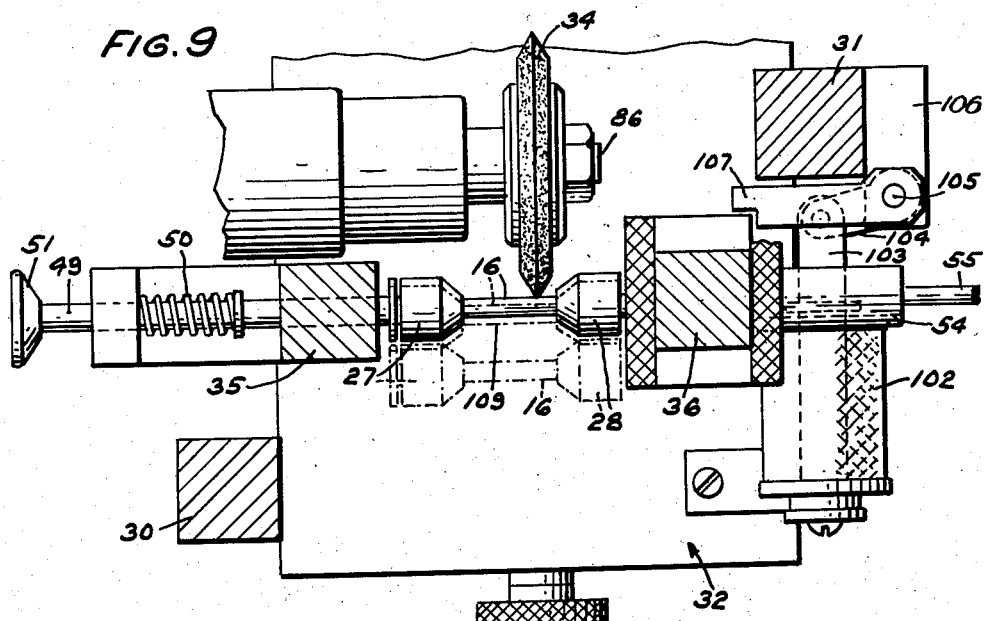
Figure 10:
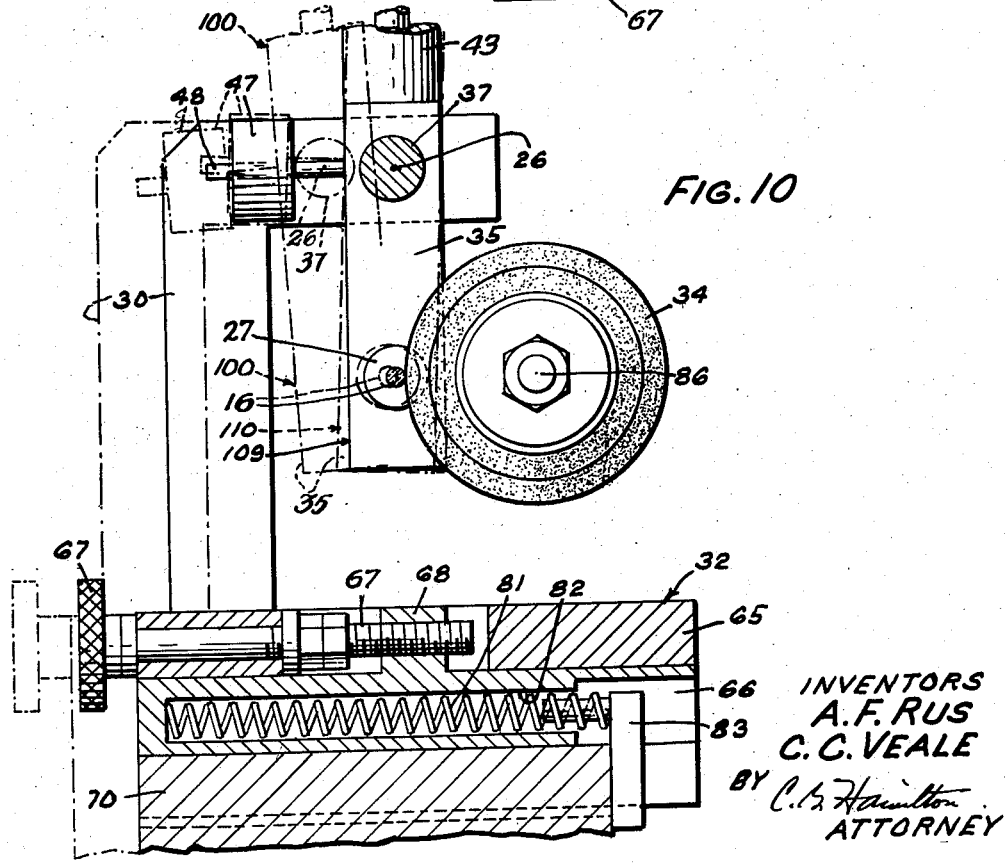

Figs. 5 and 6 are vertical cross-sectional views taken on the lines 5—5 and 6—6, respectively, of Fig. 1;

Fig. 7 is an enlarged vertical cross-sectional view taken on the line 7—7 of Fig. 1;

Fig. 8 is a diagrammatic view showing a portion of the apparatus for cutting a helical groove in the resistor and showing the electrical devices associated therewith;

Fig. 9 is an enlarged fragmentary plan sectional view taken along the line 9—9 of Fig. 7; and Fig. 10 is an enlarged fragmentary vertical sectional view taken along the line 10—10 of Fig. 7.

The present apparatus is designed to cut a helical groove 15 into a cylindrical resistor 16 (Figs. 3 and 4) and through an electrical conducting coating of carbon 17 disposed on the outer surface of a ceramic rod 18 forming the core of the resistor 16 to increase the resistance of the coating to a predetermined value.

Generally, the apparatus comprises a counterbalanced holder 25 mounted for oscillatable movement about a horizontal axis 26 and having a pair of horizontally disposed coaxially aligned chucks 27, 28 rotatably supported thereon below and in spaced relation to the axis 26 for receiving the ends of a resistor 16 to support the resistor and impart rotation thereto. The holder 25 is supported on a pair of inverted L-shaped arms 30, 31 secured to and extending upwardly from a carriage or slide 32 which is mounted for horizontal movement on a base 33 and is adapted to be advanced to a predetermined operative position to carry the resistor into engagement with a rotary cutter 34. This cutter comprises a wheel of abrasive material with a V-shaped cutting edge and it is adapted to be moved in an axial direction to the left as viewed in Fig. 9 to cut the helical groove 15 in the resistor.

The holder 25 is in the form of an inverted U-shaped yoke and comprises a pair of arms 35 and 36 secured at their upper ends to a shaft 37, the ends of which have recessed ball bearing elements 39 (Fig. 7) cooperating with the tapered ends of pins 40 in the supporting arms 30 and 31 for pivotally supporting the chucks 27 and 28 and a resistor 16 therein below and for free oscillatable movement about the axis 26. The arm 36 is insulated from the shaft 37 by a sleeve of insulating material 41. Rods 42 extending upwardly from the arms 35 and 36 have tubular counterweights 43 adjustably secured thereto for counterbalancing the holder 25 for free swinging movement about the axis 26. A pointer 44 secured to the shaft 37 cooperates with a reference line 45 on a member 46 secured to the arm 31 of the carriage to indicate when the holder 25 is in a vertical position of repose with the chucks 27 and 28 in vertical alignment with the axis 26.

A weight 47 is adjustably secured to a rod 48 extending horizontally from the shaft 37 for biasing the holder 25 for turning movement in a counterclockwise direction as viewed in Figs. 5 and 10 to urge the resistor 16 into engagement with the cutter 34 with a predetermined relatively light uniform pressure to produce a groove 15 in the resistor of uniform depth and width. The counterweighted holder 25 is statically and dynamically balanced while the weight 47 is positioned on the rod 48 in engagement with the shaft 37 and the holder 25 is in a vertical position. This prevents oscillatory movement of the holder about the axis 26 when the carriage is advanced or retracted. After the holder 25 has been balanced the weight 47 is adjusted on the rod 48 to obtain the desired angular movement of the holder about the axis 26 to a normal tilted position indicated in dotted lines at 100 in Fig. 10 so that when the carriage 32 is moved into a predetermined operative position with the resistor 16 in engagement with the cutter 34, the holder 25 is oscillated about the axis 26 by the cutter to its vertical position as shown in full lines in Fig. 10, and the holder 25 by virtue of the weight 47 serves to press the resistor 16 against the cutter with a predetermined uniform pressure. The inertia of the counterweighted holder 25 tends to prevent and dampen any oscillatory vibration thereof about the axis 26 when the cutter 34 engages a hard spot in the resistor which might tend to thrust the resistor away from the cutter and momentarily disengage the resistor from the cutter.

The chuck 27 is recessed at one end to receive and frictionally hold one end of the resistor 16 and is fixed to a rod 49 which is supported in bearing apertures in the arm 35 for rotation and for axial movement. A spring 50 urges the rod 49 and the chuck 27 toward the chuck 28 and the rod 49 has a handle 51 for retracting the chuck 27 to insert a resistor in the chucks. The chuck 28, which is driven to rotate the resistor, has a recessed end for receiving the other end of the resistor and is secured to a shaft 53 which is journalled in roller bearings in the arm 36 of the holder 25. The shaft 53 is connected through a universal joint 54 to one end of a shaft 55, which, at its other end, is slidably connected to a universal joint and commutator 56. The universal joint 56 is secured to a drive shaft 57 of a variable speed transmission 58 which is mounted on the base 33 and is driven by a motor 59. The variable speed transmission has an adjustable handle 60 by means of which the speed of rotation of the shaft 57 and the resistor in the chucks 27 and 28 may be varied to vary the pitch of the groove 15 in the resistor 16. A flexible conductor 62 is connected to the commutator 56 and the universal joint 54 to insure a good electrical connection therebetween as the carriage 32 and the holder 25 are moved back and forth during which the shaft 55 slides relative to the commutator 56.

The carriage 32 on which the arms 30 and 31 are mounted comprises an upper plate 65 (Figs. 7 and 10) having a dove-tailed slot for receiving a dove-tail portion of an intermediate plate 66 on which the plate 65 is adjustably secured by an adjusting screw 67 which is rotatably mounted in the plate 65 against axial movement and threadedly engages an apertured lug on the slide 66. The slide 66 has a dove-tailed slot for receiving a dove-tailed portion of a guide block 70 secured to the base 33 for guiding the slide 66 and the carriage 32 for horizontal movement toward and away from the cutter 34. An arm 72 secured to the slide 66 and extending horizontally therefrom under a cam shaft 73, carries a cam follower 74 which engages a cam 75 on the shaft 73. The cam shaft 73 is supported in bearing brackets 77 on the base 33 and is driven through gearing 78 from a motor 79 mounted on the base. The cam 75 actuates the carriage 32 in a forward direction to advance the holder 35 to a predetermined operative position (Fig. 10) with the resistor 16 in engagement with the cutter 34. The plate 65 is adjusted on the carriage 32 so that as the carriage 32 approaches its operative position, the resistor 16 is engaged by the cutter 34 which serves to tilt the holder 25 about the axis 26 to its vertical position as the carriage reaches its operative position (Fig. 10). The carriage 32 is stressed for movement in the opposite direction by a pair of springs 81 which are disposed in bores 82 in the slide 66 and which push against a stationary member 83 secured to the guide block 70.

The upper plate 65 of the carriage 32 is adjusted on the plate 66 by means of the adjusting screw 67 so that when the carriage is advanced by the cam 75 to its operative position, the resistor 16 will be supported by the holder 25 in engagement with the edge of the cutter 34 and the weight 44 on the holder 25 will yieldably maintain the resistor in engagement with the cutter 34 with a predetermined relatively light pressure.

The cutter 34 is secured to a shaft 86 which is journalled in a bracket 87 secured to a slide 88 and is driven through a belt and pulley connection 89 by a motor 90 which is also mounted on the bracket 87. The slide 88 is mounted for reciprocation and has a guide block 92 secured to the base 33 and is moved to the left as viewed in Figs. 1 and 2 by a cam 93 which is secured to the cam shaft 73 and cooperates with a cam follower 94 on the slide 88. The cam 93 serves to move the slide 88 and the cutter 34 to the left from a normal starting position as viewed in Fig. 9 at a uniform velocity during the groove cutting operation and cooperates with a pair of springs 96 for returning the slide and the cutter to their starting position on completion of the groove cutting operation. The springs 96, which urge the slide 88 to the right as viewed in Figs. 1 and 2, are disposed in bores 97 in the slide 88 and push against stationary rods 98 which are disposed in one end of the bores and are secured to a stationary guide member 99 fixed to the guide block 92.

Means are provided for measuring the resistance of the resistor element 16 during the groove cutting operation and for disengaging the resistor 16 from the rotary cutter 34 to terminate the groove cutting operation when the resistance of the resistor has reached a predetermined value. For this purpose a solenoid 102 (Figs. 5 and 9) is mounted on the carriage 32 and the core 103 thereof is connected to one end of a lever 104, the other end of which is secured to a shaft 105. The shaft 105 is oscillatably supported in a bearing bracket 106 secured to the supporting arm 31 on the carriage 32 and is connected at its upper end to a lever 107 (Fig. 7) which is disposed with the end portion thereof in close proximity to the lower portion of the arm 36 of the holder 25 as shown in Fig. 9. In response to the energization of the solenoid 102 the lever 107 is actuated to swing the holder 25 and the resistor 16 from their normal position in engagement with the cutter 34 as shown in full lines in Figs. 9 and 10 to a retracted position in spaced relation to the cutter as shown in dotted lines at 109.

As shown diagrammatically in Fig. 8 a device 112 for measuring the resistance of the resistor 16 is connected through a conductor 113 and a brush 114 in engagement with the commutator 56, and the conductor 62 to the chuck 28, and the device 112 is electrically connected to the chuck 27 through a ground connection. When a resistor 16 is inserted in the chucks the conductive coating of the resistor engages the chucks and completes a circuit to the measuring device 112. The measuring device 112 has an indicator arm 115 and an adjustable control means 116 associated therewith for connecting the solenoid 102 to a power line to energize the solenoid for tilting the holder to disengage the resistor 16 from the cutter 34. The control means may be of various types and is shown diagrammatically herein as a relay 117 which is connected to a suitable power supply and has one lead connected to the indicator arm and has another lead connected to an adjustable contact 118 which may be set at various predetermined positions according to the resistance desired in the resistor 16 and which is adapted to be engaged by the contact arm 115 when the resistance of the resistor has reached the predetermined value to close the relay circuit. The relay 117 serves to actuate the switch 119 and connect the solenoid 102 to a power line 120 to effect the energization of the solenoid, the tilting of the holder 25, and the disengagement of the resistor 16 from the cutter 34.

In the operation of the apparatus the adjustable contact 118 of the control device 116 is set at a predetermined position corresponding to the value of resistance desired in the resistors, and with the carriage in its retracted or loading position, shown in Fig. 1, the operator grips a resistor with a pair of tweezers and inserts it in the ends of the chucks 27 and 28 which electrically connects the resistor to the measuring device 112. The carriage is then advanced to its operative position to move the resistor 16 into engagement with the rotary cutter 34 which moves in an axial direction to the left as viewed in Fig. 9 to cut a helical groove 15 in the resistor. When the resistance of the resistor has reached a predetermined value, the control device 116 is actuated to effect the energization of the solenoid 102 and the tilting of the holder 25 to disengage the resistor 16 from the cutter 34 and terminate the groove cutting operation. The solenoid 102 remains energized to retain the holder 25 and the resistor 16 in disengaged position until the carriage 32 has been returned to its original starting position and the cutter 34 has been returned to its starting position, at which time the completed resistor element 16 with the helical groove 15 cut therein is removed from the holder. When the resistor is removed from the holder, the resistance measuring circuit and the control circuit are broken and the solenoid actuated lever 107 is disengaged from the arm 36 of the holder 25 and allows the holder to swing about the axis 26 to its normal position with the chucks disposed in vertical alignment with the axis.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for cutting a helical groove in a resistor, a rotary cutter, means for rotating said cutter, a holder having a pair of coaxially aligned chucks rotatably mounted thereon engageable with the ends of the resistor for supporting it for rotation, mounting means for suspending said holder for free oscillatable movement about a predetermined axis above and parallel to the axis of the chucks and with the chucks and the resistor therein in substantially horizontal alignment with the cutter, means for effecting relative movement between the cutter and the holder in a direction transversely of said axes to an operative position in which the holder supports the resistor in engagement with the cutter with a predetermined pressure, means for rotating one of the chucks to rotate the resistor, means for effecting relative movement between the cutter and the holder in an axial direction to cause the cutter to cut a groove in the resistor, a weight, means for adjustably mounting the weight in different positions on the holder to adjust the pressure between the cutter and resistor when the holder is in said operative position, means electrically connected to the chucks for measuring the resistance of the resistor while a groove is being cut therein, and electrically operated means under control of the resistance measuring means for moving the holder about said predetermined axis to disengage the resistor from the cutter when the resistance of the resistor has reached a predetermined value.

2. In an apparatus for cutting a helical groove into a cylindrical dielectric article coated with electro-conductive material, a rotary cutter, means for rotating said cutter, a holder having a pair of coaxially aligned chucks rotatably mounted thereon engageable with the ends of the article for supporting it for rotation, mounting means for suspending said holder for free oscillatable movement about a predetermined axis above and parallel to the axis of the chucks and with the chucks and the article therein in substantially horizontal alignment with the cutter, means for effecting relative movement between the cutter and the holder in a direction transversely of said axes to an operative position with the article in engagement with the cutter with a predetermined pressure, means for effecting relative movement between the cutter and the holder in an axial direction to cause the cutter to cut a helical groove in the article, adjustable means on the holder for changing the angular position of repose of the holder about said predetermined axis to adjust the pressure between the cutter and the article when the holder and cutter are in said operative position, means electrically connected to the chucks in said holder for measuring the resistance of the article therein, electrically operated means for oscillating said holder about said predetermined axis to disengage the article from the cutter, and adjustable control means associated with said measuring means for effecting the actuation of said electrically operated means to oscillate the holder and disengage the article from the cutter when the resistance of the article has reached a predetermined value.

3. In an apparatus for cutting a helical groove into a cylindrical article, a base, a rotary cutter mounted on said base for rotation about a first axis and for movement along said axis, a slide mounted on said base for movement to and from the cutter in a direction perpendicular to the first axis, a holder for supporting the article for rotation about a second axis, means on said slide for suspending the holder for free oscillatable movement about a third axis parallel to said first and said second axes and with the second axis disposed below the third axis and in substantially horizontal alignment with the first axis, means for advancing the slide to a predetermined operative position with the article supported by the holder in contact with the cutter, a weight adjustably mounted on the holder in laterally spaced relation to the third axis for biasing the holder for turning movement about said third axis to urge the article against the cutter with a predetermined pressure, and means for turning said holder about the third axis to disengage the article from the cutter.

4. In an apparatus for cutting a helical groove into a cylindrical article, a base, a rotary cutter mounted on said base for rotation about a first axis and for movement along said axis, a slide mounted on said base for movement to and from the cutter in a direction perpendicular to the first axis, a holder for supporting the article for rotation about a second axis, mounting means on said slide for suspending the holder for free oscillatable movement about a third axis parallel to said first and said second axes and with the second axis disposed below the third and in substantially horizontal alignment with the first axis, means for indicating a normal position of repose of said holder, means for advancing the slide to a predetermined forward position, means for adjusting the mounting means on said slide to locate the holder in an operative position with the article supported in the holder in contact with the cutter, a weight, and means for adjustably supporting the weight on the holder in laterally spaced relation to said third axis for biasing the holder for turning movement about said third axis to urge the article against the cutter with a predetermined pressure, and means on said slide for turning said holder about the third axis to disengage the article from the cutter.

5. In an apparatus for cutting a helical groove into a cylindrical article, a base, a rotary cutter mounted on said base for rotation about a first axis and for movement along said axis, means for rotating the cutter, means for moving the cutter along said axis, a slide mounted on said base for horizontal movement to and from the cutter in a direction perpendicular to the first axis, a holder for supporting the article for rotation about a second axis, mounting means on said slide for suspending the holder for free oscillatable movement about a third axis parallel to said first and said second axes and with the second axis disposed vertically below the third axis and in substantially horizontal alignment with the first axis, means for rotating the resistor in the holder while permitting free oscillatable movement of the holder, means on said holder extending upwardly from said third axis for counter-balancing said holder, means for indicating a normal position of repose of said holder with the second and the third axes in vertical alignment, means operable in timed relation to the axial movement of the cutter for advancing the slide to a predetermined forward position, means for adjusting the mounting means horizontally on said slide to locate the holder in an operative position with the article supported by the holder in contact with the cutter, a weight, and means for adjustably supporting the weight on the holder in laterally spaced relation to said third axis for biasing the holder for turning movement about said third axis to urge the article against the cutter with a predetermined pressure, and means on said slide for turning said holder about the third axis to disengage the article from the cutter.

6. In an apparatus for cutting a helical groove into a cylindrical dielectric article coated with electro-conductive material, a base, a rotary cutter mounted on said base for rotation about a first axis and for movement along said axis, means for rotating the cutter, means for moving the cutter along said axis, a slide mounted on said base for horizontal movement to and from the cutter in a direction perpendicular to the first axis, a holder having a pair of coaxially aligned chucks for supporting the article for rotation about a second axis, means on said slide for suspending the holder for free oscillatable movement about a third axis parallel to said first and said second axes and with the second axis disposed vertically below the third axis and in substantially horizontal alignment with the first axis, means for advancing the slide to a predetermined operative position with the resistor supported in the holder in contact with the cutter, a weight, means for adjustably supporting the weight on the holder in laterally spaced relation to said third axis for biasing the holder for turning movement about said third axis to urge the article against the cutter with a predetermined pressure, means electrically connected to the chucks for measuring the resistance of the article, a movable element mounted on the slide in spaced relation to the holder for turning the holder about said third axis to disengage the article from the cutter, electrically operated means on said slide for actuating said element, and adjustable control means associated with said measuring means for effecting the actuation of said electrically operated means and the disengagement of the article from the cutter when the resistance of the article has reached a predetermined value.

References Cited in the file of this patent
UNITED STATES PATENTS

| | | |
|---|---|---|
| 1,635,184 | Jones | July 12, 1927 |
| 2,023,494 | Strieby | Dec. 10, 1935 |
| 2,405,485 | Barkstrom et al. | Aug. 6, 1946 |
| 2,669,811 | Henderson | Feb. 23, 1954 |
| 2,743,554 | Dailey et al. | May 1, 1956 |